Nov. 28, 1944.  E. BOECKING  2,363,855
FRAMING MECHANISM
Filed Feb. 19, 1941  3 Sheets-Sheet 1

INVENTOR
Ewald Boecking
BY
Hastings W. Baker
ATTORNEY

Nov. 28, 1944.   E. BOECKING   2,363,855
FRAMING MECHANISM
Filed Feb. 19, 1941   3 Sheets-Sheet 2

INVENTOR
Ewald Boecking
BY
Hastings W. Barker
ATTORNEY

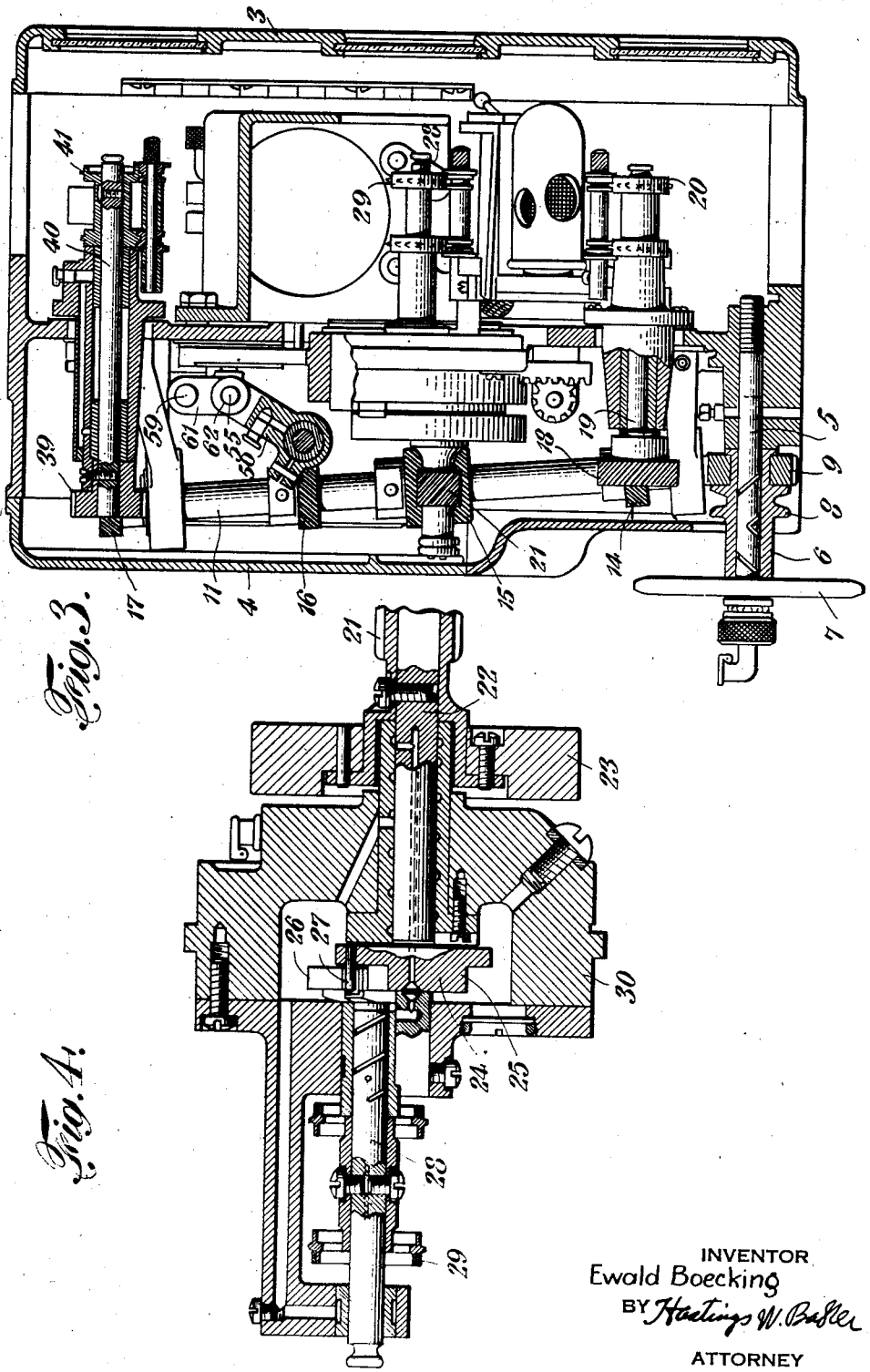

Patented Nov. 28, 1944

2,363,855

UNITED STATES PATENT OFFICE 2,363,855

FRAMING MECHANISM

Ewald Boecking, Great Kills, N. Y., assignor to International Projector Corporation, New York, N. Y., a corporation of Delaware Application February 19, 1941, Serial No. 379,575

10 Claims. (Cl. 88—18.3)

This invention relates to a framing mechanism for a motion picture projector.

Framing mechanisms have heretofore been of many types. One of the common types was a mechanism whereby the operator could frame the picture by merely raising or lowering the intermittent feed sprocket without rotating it and without rotating the shutter such as shown in the patent to Power 1,773,981. Another common type is a mechanism whereby the operator could frame by rotating the intermittent sprocket and correspondingly rotating the shutter. This requires that the intermittent housing be rotated. Such a type of framing mechanism is shown in the patent to Porter 1,041,345. In my improved construction I frame by moving the intermittent sprocket up or down and simultaneously rotating the shutter shaft and the driving shaft extending into the intermittent housing but without imparting any rotation to the intermittent housing.

Figure 1:
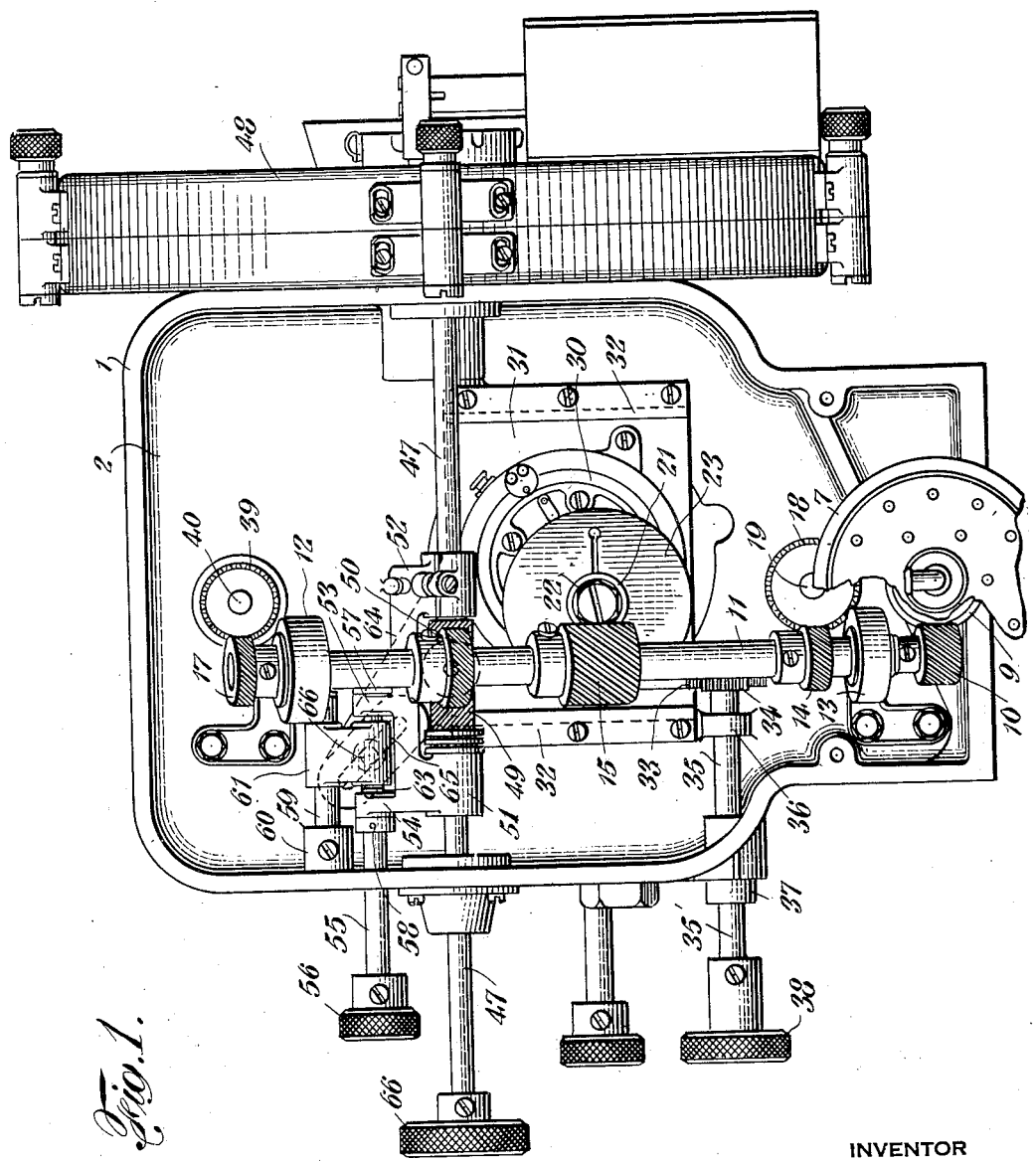
Figure 2:
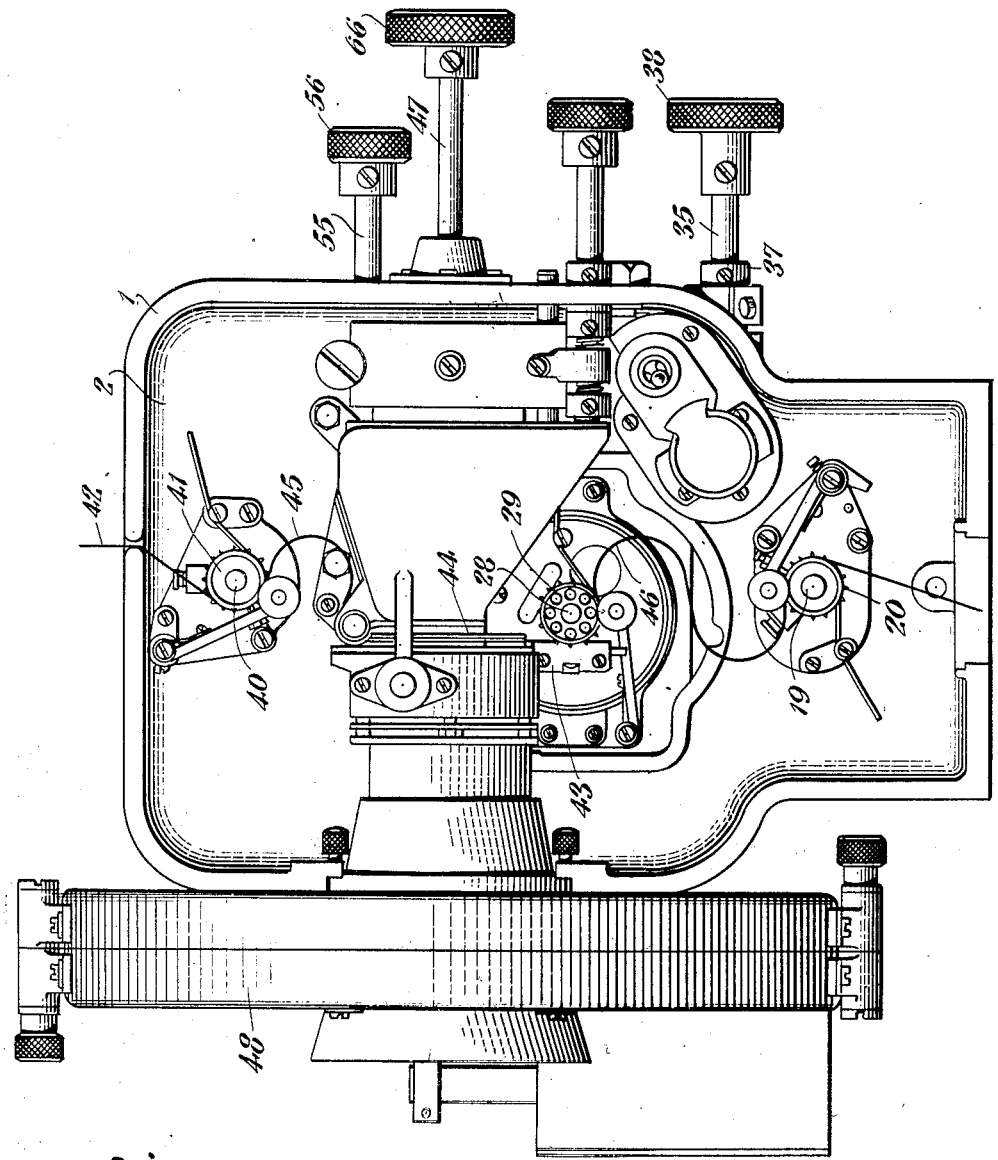

As is well known to those familiar with the art, the framing of a motion picture must be precise. The aperture through which the light passes is usually fixed so that the optical axis of the beam of light will strike approximately on the center of the screen. In 35 m. m. motion picture film each frame or picture has four sprocket holes on each side thereof. The operator would ordinarily observe some care when inserting the film to see that the picture was in proper position relative to the aperture but it is entirely conceivable that he might insert the film so that the picure was a little too high or too low. In any case, however, the framing mechanism serves as a means whereby the picture may be moved relative to the aperture so that the picture is correctly framed on the screen. Obviously, if mechanism were provided to rotate the intermittent sprocket, the operator might thereby move the picture into correct position relative to the aperture and if this were the only problem it would be a very simple matter simply to rotate the intermittent sprocket. However, the intermittent sprocket is driven by a star wheel which is intended to drive the intermittent sprocket only during that period of time that the shutter is cutting off the light to the aperture and this relationship must not be disturbed. The entire problem is solved, however, by a mechanism forming the subject-matter of this invention and which may be better understood by referring to the attached drawings, Fig. 1 is a side elevational view of a motion picture projector having my invention incorporated therein, Fig. 2 is an elevational view on the opposite side of the view from that shown in Fig. 1, Fig. 3 is a cross-sectional view through approximately the center of the machine shown in Figs. 1 and 2 and looking to the rear, and Fig. 4 is a detailed cross-sectional view of the intermittent mechanism.

The projector consists of a housing 1 having a central plate 2 and the housing is, of course, provided with conventional side doors 3 and 4.

Mounted in the bottom of the housing is a fixed shaft 5 on which is mounted a rotatable sleeve 6 driven by driving member 7, which sleeve is provided with a pulley 8 over which a belt may be trained to drive the take-up reel. It is also provided with a gear 9 which drives a gear 10 secured to a substantially vertically extending shaft 11 mounted in bearings 12 and 13. Secured to the shaft 11 are worm gears 14, 15, 16 and 17. The worm gear 14 drives a worm gear 18 secured to the shaft 19 which carries the lower feed sprocket 20. The upper worm gear 17 meshes with and drives a pinion 39 secured to a shaft 40 to which is secured the upper continuously feeding sprocket 41. The gear 15 meshes with and drives a worm gear 21 secured to the cam shaft 22 to which is secured the flywheel 23, and the cam 24 is made integral with the said shaft 22. The cam 24 has an arcuate surface 25 extending for approximately 270° and the conventional cutaway portion adapted to receive the projections of the star wheel 26 when the star wheel is actuated by the pin 27 carried by the cam. The star wheel is secured to the intermittent sprocket shaft 28 carrying the intermittent sprocket 29. This intermittent sprocket mechanism is of well known design and requires no detailed description.

The housing 30 is secured to a slidable plate 31 held against lateral displacement by the guides 32 but adapted to slide up and down between the said guides and the plate 2. The lower end of the slidable plate 31 is provided with a rack 33 which meshes with a pinion 34 secured to a shaft 35 mounted in bearings 36 and 37. At the outer end of the shaft 30 is secured a thumb nut 38 so that by rotating the thumb nut the operator may raise or lower the slidable plate 31 carrying the intermittent housing and all of the mechanism housed therein or supported thereby, including the shaft 22 which latter shaft would be rotated on its own axis by its pinion 21 engaging the worm gear 15, that is, if the worm gear 15 were standing still the shaft 22 would be rotated when the slidable plate 31 is raised or lowered, but if the worm gear 15 were rotated and thereby rotating the shaft 22, the movement of the slidable plate 31 would increase or decrease the amount of the rotation of the shaft 22 corresponding to the amount of movement of the slidable plate 31. This rotation of the shaft 22 caused by the movement of the slidable plate 31 would not rotate the intermittent sprocket 29 as long as the star wheel 26 was in engagement with the arcuate surface 25 but it would change the position of the pin 27 relative to the star wheel and this movement would be exactly proportionate to the rotation of the shutter as will be hereinafter described. When the shaft 22 is advanced or retarded by the movement of the slidable plate 31, the shaft 11 would not be advanced or retarded and the continuously feeding sprockets would not be affected. As shown in Fig. 2, the film 42 passes downwardly into the projector through a slot in the top wall of the casing, around the upper continuously feeding sprocket 41 thence downwardly between the conventional film trap 43 and gate 44, around the intermittent sprocket 29 and thence over the lower continuously feeding sprocket 20, there being an upper loop 45 between the sprocket 41 and the film trap and gate and a lower loop 46 between the intermittent sprocket 29 and the lower continuously feeding sprocket 20.

As heretofore mentioned, it will be necessary to rotate the shutter in synchronism with the rotation of the shaft 22. The upward and downward movement of the slideable plate 31 does not advance or retard the shaft 11 but simply advances or retards the shaft 22 which is the driving shaft for the intermittent mechanism as heretofore described. The shutter shaft 47 carrying the shutter in the shutter housing 48 is normally rotated by the worm gear 16 on the shaft 11 meshing with and driving an elongated worm gear 49 splined to the shutter shaft 47 so that as the shaft 11 rotates, the shutter shaft 47 will rotate at the same speed, the gear ratio between the gear 16 and 49 being 1—1. The gear 49, splined to the shutter shaft 47 is normally prevented from moving to the right or left as viewed in Fig. 1 by a bracket 50 having arms 51 and 52, the arms being slidable on the shaft 47 and the inner sides of each arm contacting the gear 49 so as to prevent slidable movement of the gear 49 unless the bracket 50 is likewise moved longitudinally. The bracket 50 is provided with upstanding arms 53 and 54 through which passes a shaft 55 provided with a knob 56, the shaft 55 being slidable through the front wall of the casing. The shaft 55 is provided with collars 57 and 58 pinned to the shaft so that if the bracket 50 is moved longitudinally of the shutter shaft 47 the shaft 55 will likewise move longitudinally, but of course, the shaft 55 could be rotated. A fixed shaft 59 is secured to the front wall of the casing by a collar 60 and a downwardly extending bracket 61 is slidably mounted on the shaft 59. The lower portion of the bracket 61 is provided with a threaded hole 62 which receives threads 63 formed on the shaft 55. It is, therefore apparent that if the knob 56 should be rotated and the bracket 61 should be held stationary the threaded engagement between the shaft 55 and the bracket 61 would cause the shaft 55 to be moved longitudinally or to the right or the left as viewed in Fig. 1 and this movement would be imparted to the bracket 50 which would move the worm gear 49 longitudinally of the shaft 47. If the shaft 11 were stationary the longitudinal movement of the gear 49 splined to the shaft 47 would cause the shutter to be advanced or retarded. This adjustment is but seldom necessary but is useful in positioning the shutter precisely so as to advance or retard slightly the cutting off of the light by the shutter relative to the feeding of the film by the intermittent sprocket 29. The advantages of such a construction are fully described in the patent to Dina 1,949,458.

In order to cause the shutter shaft 47 to be advanced or retarded in synchronism with the shaft 22 when framing, the slidable plate 31 is provided with an upwardly and forwardly extending arm 64 provided with a slot 65 extending at an angle of approximately 45° with the horizontal. This cam slot receives a pin 66 carried by the bracket 61.

The framing is, therefore, accomplished by rotating the nut 38 which rotates the shaft 35 and pinion 34 which meshes with the rack 33 and raises or lowers the slidable plate 31, which movement raises or lowers the shaft 22 which is the operating shaft of the intermittent mechanism but this does not advance or retard the shaft 11. It simply rotates the shaft 22 relative to its pinion 15, the gear 21 simply climbing up or down on the pinion 15 and thereby moving the pin 27 carried by the intermittent cam 24 relative to the star wheel 26. The upward or downward movement of the slidable plate 31 also correspondingly moves the arm 64 and the oblique cam slot 65 thereby sliding the bracket 61 on the shaft 59 and the bracket 50 and worm gear 49 will move correspondingly, thereby advancing or retarding the shaft 47, and in an amount precisely corresponding to the rotation of the shaft 22. The shutter shaft 47 is provided with a knob 66 whereby the shutter shaft might be rotated manually but when it is thus rotated without moving the bracket 50 the shaft 11 and intermittent driving shaft 22 would be correspondingly rotated.

I realize that many changes may be made in the specific form of the invention as herein shown and without departing from the spirit of the invention.

Having now described my invention, I claim:

1. In a motion picture projector, a shutter shaft, an intermittent film feeding mechanism, a housing for said mechanism, means to move the said mechanism and housing relative to the optical axis of the projector, a cam shaft forming a part of said mechanism, means to rotate said cam shaft and said shutter shaft synchronously by the movement of said mechanism when the mechanism is moved relative to the optical axis and means to prevent the said housing from partially rotating when the said housing is moved.

2. In a motion picture projector, a shutter shaft, an intermittent film feeding mechanism, a housing for said mechanism including a cam shaft, a cam and a pin on said cam shaft and an intermittent sprocket driven by said pin and held against rotation by said cam, means to move said mechanism and housing toward or away from the optical axis of the projector, means to rotate said cam shaft and said shutter shaft synchronously by the movement of said mechanism when the mechanism is moved relative to the optical axis of the projector and means to prevent the said housing from partially rotating when the said housing is moved.

3. In a motion picture projector, a shutter shaft, an intermittent film feeding mechanism, a slide in which the said mechanism is mounted, means to actuate said slide so as to move the said mechanism toward or away from the optical axis of said projector, a cam shaft forming a part of said mechanism, means to rotate said cam shaft and shutter shaft in unison and at normal speed and means to advance or retard the rotation of said shutter shaft and cam shaft relative to the normal rotation thereof as said slide is actuated.

4. In a motion picture projector, an intermittent mechanism, a housing for said mechanism, a cam shaft forming a part of said mechanism, a slide in which said housing is secured against rotation, a shutter shaft, means to rotate said cam shaft and shutter shaft in unison and at a substantially fixed speed and means to retard or advance said shutter shaft and cam shaft synchronously relative to the normal speed at which they are rotated as said slide is actuated.

5. In a motion picture projector, an intermittent mechanism, a housing for said mechanism, a cam shaft forming a part of said mechanism, a slide in which said housing is secured, means to actuate said slide, an arm forming a part of said slide and provided with a cam slot, a shutter shaft, a worm gear splined to said shutter shaft, a drive shaft, gearing connecting said drive shaft to said cam shaft, a gear on said drive shaft meshing with the gear on the shutter shaft, means controlled by the cam slot to move said splined gear longitudinally of the shutter shaft to thereby advance or retard the shutter shaft when the slide is actuated, the gear on the cam shaft climbing up or down on its gear on the drive shaft to thereby advance or retard the cam shaft, the gearing being such that the cam shaft and shutter shaft are rotated synchronously.

6. In a motion picture projector, a shutter shaft, an intermittent sprocket mechanism, a housing for said mechanism, a cam shaft forming a part of said mechanism, driving means whereby said shutter shaft and cam shaft are normally driven, actuating means to shift said housing toward or away from the optical axis of the projector, means whereby the shutter shaft is advanced or retarded in synchronism with the cam shaft by the movement of the housing when the housing is shifted and means to advance or retard the shutter shaft relative to the cam shaft and means to prevent the said housing from partially rotating when the said housing is moved.

7. In a motion picture projector, a drive shaft for said projector, an intermittent film feeding sprocket mechanism, a housing for said mechanism, a cam shaft forming a part of the intermittent sprocket mechanism, worm gearing connecting said drive shaft and said cam shaft, means to shift said housing relative to the optical axis of the projector, said cam shaft gear rolling longitudinally of the gear on the drive shaft to thereby advance or retard the cam shaft and means to prevent the housing from turning when the cam shaft is adjusted.

8. In a motion picture projector, a drive shaft for said projector, an intermittent film feeding sprocket mechanism, a housing for said mechanism, a cam shaft forming a part of the intermittent sprocket mechanism, worm gearing connecting said drive shaft and said cam shaft, means to shift said housing relative to the optical axis of the projector, said cam shaft gear rolling longitudinally of the gear on the drive shaft to thereby advance or retard the cam shaft, a shutter shaft and means to rotate the shutter shaft synchronously with the cam shaft.

9. In a motion picture projector, a drive shaft for said projector, a cam shaft, worm gears connecting said drive shaft and cam shaft, an intermittent sprocket shaft, a sprocket on said intermittent sprocket shaft, a star wheel secured to said cam shaft adapted to hold said star wheel against rotation during a portion of the rotation of the cam, a pin carried by said cam shaft and adapted to drive said star wheel during the remainder of each revolution of the cam shaft, a housing for said cam shaft, intermittent sprocket shaft, cam, pin and star wheel, means to move said housing toward or away from the optical axis of the projector, said gear on the cam shaft rolling on the gear of the drive shaft when the housing is shifted to advance or retard the position of the pin relative to the star wheel, a shutter shaft and means to rotate the shutter shaft synchronously with the cam shaft.

10. In a motion picture projector, an intermittent sprocket mechanism, a housing therefor, means to raise or lower said housing relative to the optical axis of the projector, an arm provided with a cam slot movable with the housing, a shutter shaft, a worm gear splined thereto, a bracket normally preventing longitudinal movement of the splined gear, means interconnecting said bracket and cam slot so that when the housing is raised or lowered the splined gear will be moved longitudinally of the shutter shaft and means whereby the shutter shaft is advanced or retarded when the splined gear is moved longitudinally of the shutter shaft.

EWALD BOECKING.